United States Patent [19]

Akesson

[11] Patent Number: 4,787,305

[45] Date of Patent: Nov. 29, 1988

[54] MACHINE FOR HOLLOWING VEGETABLES AND FRUITS

[75] Inventor: Yngve Akesson, Helsingborg, Sweden

[73] Assignee: Progressive Food Engineering AB, Helsingborg, Sweden

[21] Appl. No.: 44,050

[22] Filed: Apr. 29, 1987

[30] Foreign Application Priority Data

Apr. 30, 1986 [SE] Sweden .................. 8602013

[51] Int. Cl.⁴ ............................................ A47J 23/00
[52] U.S. Cl. ........................................ 99/538; 99/541; 99/544; 99/638
[58] Field of Search .......................... 99/537, 538–541, 99/543, 544, 545–548, 635, 637, 638, 642; 426/478, 481, 482

[56] References Cited

U.S. PATENT DOCUMENTS 2,252,951 8/1941 Urschel et al. .................. 99/642
4,157,681 6/1979 Akesson .

FOREIGN PATENT DOCUMENTS 433560 9/1977 Sweden .

Primary Examiner—Timothy F. Simone
Attorney, Agent, or Firm—Ladas & Parry

[57] ABSTRACT

The present invention relates to a hollowing machine for vegetables and fruits comprising a frame (1) with a lower table (2), a central table (3), an upper table (4) and outermost a step-by-step pivoting table (7), placed above the upper table. The pivoting table is provided with recesses or pockets for keeping a vegetable or fruit, e.g. a head of cauliflower. The machine comprises a supporting device (103) and a holding device (104) for centering and holding the head of cauliflower in the correct position. Below the outer pivoting table (7) and the upper table (4), centered under one of the recesses, a device of the iris diaphragm (83) type is arranged and straight under this diaphragm a knife head (46) and control devices (107, 36) for controlling the up- and downward movements of the knife head are arranged. The knife head comprises i.a. a cutting knife (50), which when the iris diaphragm opens is brought up through the opening of the iris diaphragm and cuts out a part of the vegetable or fruit which rests on the iris diaphragm. The knife head, the knife and the iris diaphragm are synchronized with the step-by-step pivoting table and depends on and is controlled by the diameter of the head of cauliflower. When the knife has cut out the part in question of the vegetable or fruit the knife is immediately withdrawn at the same time as the cut out part falls down through the opening of the iris diaphragm and out to a collecting unit. The remaining part of the vegetable or fruit may thereafter be transported to a separate collecting unit. (FIG. 1).

10 Claims, 2 Drawing Sheets

MACHINE FOR HOLLOWING VEGETABLES AND FRUITS

BACKGROUND OF THE INVENTION

This invention relates to a machine for hollowing vegetables, fruits or parts thereof having at their base a central portion to be separated along a hemspherical or ogival surface from the surrounding portion.

Machines for hollowing such products as vegetables and fruits, where the product is placed with the stalk cut off during harvest turned upward in recesses or holders, are known. These recesses are moved discontinuously along a circular or straight path, while a circular blade of invariable diameter makes a cylindrical hollow in the product, or the products are placed with the stalk portions turned downward in recesses, while a bent knife of variable diameter makes a convex cut for cutting out the central portion of the vegetable or fruit.

An example of a previously known machine is given in U.S. Pat. No. 2,252,951. According to this document tomatoes are hollowed from above by a bent knife. Other examples of known machines are given in the French Patent No. No. 1,457,722 and the Swedish Patent No. 771662-1. The French patent relates to separation of chosen parts of an artichoke, where a bent knife works from below with a variable cutting diameter. The Swedish patent relates to a machine for paring vegetables and fruits, especially cauliflower, and here as well a bent knife works from below with a variable diameter.

These known machines with bent knives are the most optimal, since the diameter of the cut out central portion is adapted to the diameter of the product and the convex form of the cut out central portion corresponds to the form of that part of the product that one wishes to separate before further processing the product.

The disadvantages of the known devices are nevertheless that the cut out central portion leaves the machine together with the usable part of the product and it is therefore necessary to manually separate the central portion from the usable part of the product on a sorting band and it is not possible to vary the form, i.e., the ratio between the diameter and the height, of the cut out portion.

SUMMARY OF THE INVENTION

One object of the present invention is to provide a machine for hollowing vegetables and fruits, which eliminates these drawbacks.

Another object of the present invention is to provide a machine for hollowing vegetables and fruits, where the mechanical construction and the way of working of the machine is considerable improved and simplified compared to previously known machines.

Said objects are achieved by means of a machine for hollowing vegetables or fruits, where the vegetables are placed in recesses on a pivoting plate, the machine comprising a device of the iris diaphragm type, on which the vegetable or fruit rests during the hollowing operation and which diaphragm can be opened or closed for separation of a cut out part of the vegetable or fruit.

In order to achieve said objects the machine according to the invention comprises beside a knife head and a guiding for adjustment of the top position of the knife also parts by means of which it is possible to adjust the form of the cut out part of the vegetable or fruit.

The machine according to the present invention includes a knife, which is curved towards the vertical axis of the product, rotatable around this axis and movable over an arc of a circle which is convex in relation to the axis between two positions, namely one position retracted from the product and one position for cutting, a device in form of an iris diaphragm opening for the knife and having the cut out stalk fall through this opening at the same time as the knife goes back to the retracted position followed by the closing of the iris diaphragm.

In the preferred embodiment, more closely described below, the machine moreover comprises a device for adjusting the top position of the cutting surface, over which the knife moves, being controlled by the outer diameter of the cauliflower, which may vary rather much. Moreover, the knife attachment is provided with a linkage, which makes it possible to change the diameter of the cut out stalk in relation to the outer diameter of the cauliflower without having to change the length of the knife.

For adjustment of the upper turning point during cutting the machine also comprises a knife guiding means, by means of which the angular motion of the knife is set.

The machine according to the invention is also provided with a brake device for locking the automatic setting of the top position of the knife during the actual cutting movement and a supporting device for preventing the the cauliflower head from being lifted up from the support due to the resistance to cutting of the knife during the hollowing operation.

By means of the machine according to the present invention it is possible to vary the size as well as the form of the cut out part. The head of the knife may be placed in various upper positions, giving cut out parts with different diameters and different heights and it is furthermore possible to change the stroke of the knife so that the cut out parts are given the same base diameter but different heights.

BRIEF DESCRIPTION OF THE DRAWINGS

The machine according to the invention will now be described more in detail with reference to a preferred, but not limiting, embodiment, the included parts and its function are being illustrated in the attached drawings and in the following description.

In the drawings

DESCRIPTION OF PREFERRED EMBODIMENT

In the description below hollowing of cauliflower heads is used as an example to explain the function of the machine but it is obvious that the use of the machine according to the invention is not limited to hollowing of cauliflower heads but this machine may advantageously as well be used for other vegetables and fruits or parts thereof from which a central portion is to be separated along a hemspherical or ogival surface from the other parts of the product. Thus, it may be all kinds of cabbage such as white cabbage, red cabbage, etc., all kinds of salad, some kinds of pepper and tomatoes but fruits as well such as e.g. halves of grapefruit of other citrus fruits, where one wishes to separate the pulp from the peel.

The machine according to the present invention includes a knife, which is curved towards the vertical axis of the product, rotatable around this axis and movable over an arc of a circle which is convex in relation to the axis between two positions, namely one position retracted from the product and one position for cutting, a device in form of an iris diaphragm opening for the knife and having the cut out stalk fall through this opening at the same time as the knife goes back to the retracted position followed by the closing of the iris diaphragm.

In the preferred embodiment, more closely described below, the machine moreover comprises a device for adjusting the top position of the cutting surface, over which the knife moves, being controlled by the outer diameter of the cauliflower, which may vary rather much. Moreover, the knife attachment is provided with a linkage, which makes it possible to change the diameter of the cut out stalk in relation to the outer diameter of the cauliflower without having to change the length of the knife.

For adjustment of the upper turning point during cutting the machine also comprises a knife guiding means, by means of which the angular motion of the knife is set.

The machine according to the invention is also provided with a brake device for locking the automatic setting of the top position of the knife during the actual cutting movement and a supporting device for preventing the the cauliflower head from being lifted up from the support due to the resistance to cutting of the knife during the hollowing operation.

Figure 1:
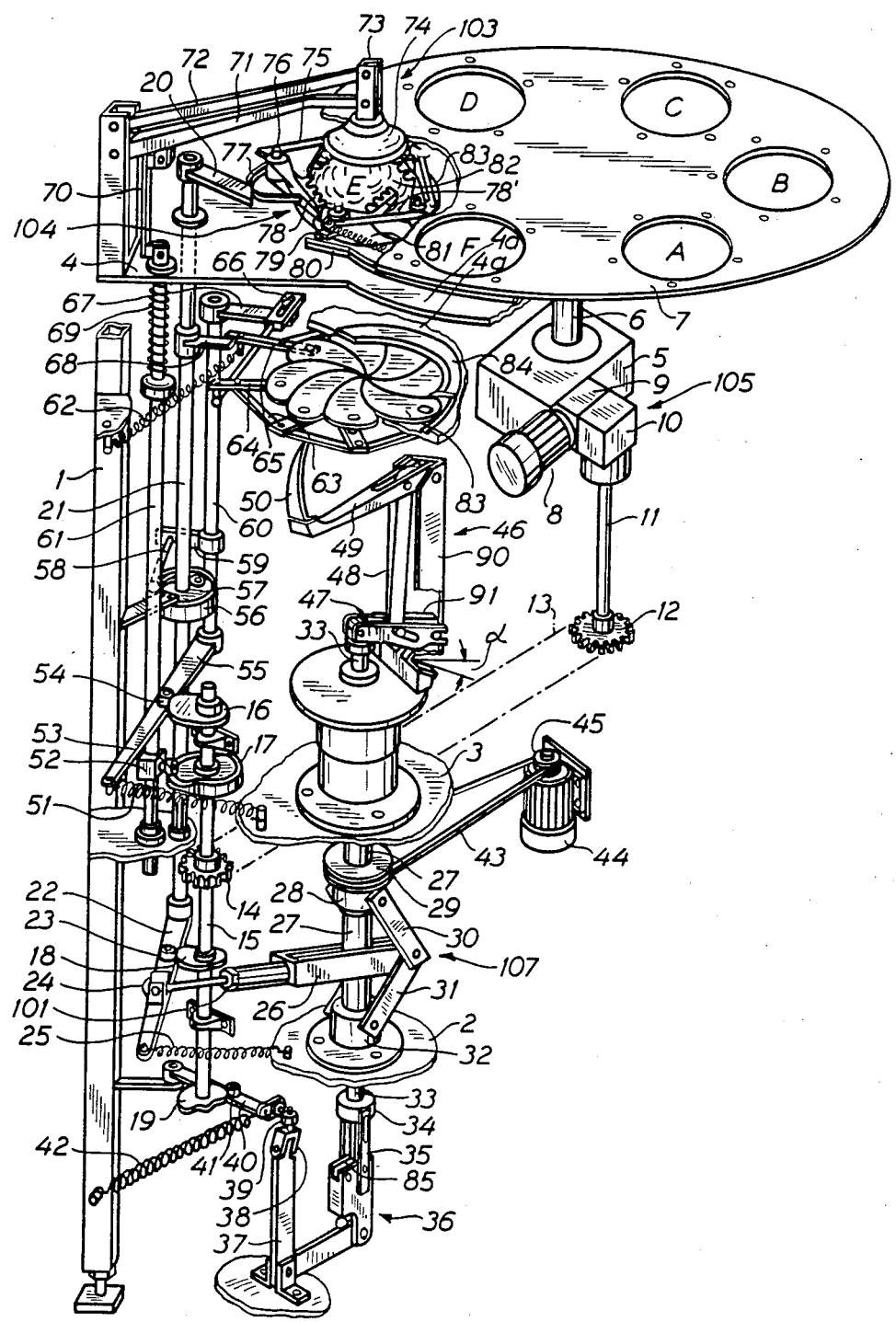
FIG. 1 is an exploded view in perspective of one embodiment of the machine according to the invention and with some parts cut away.
Figure 4:
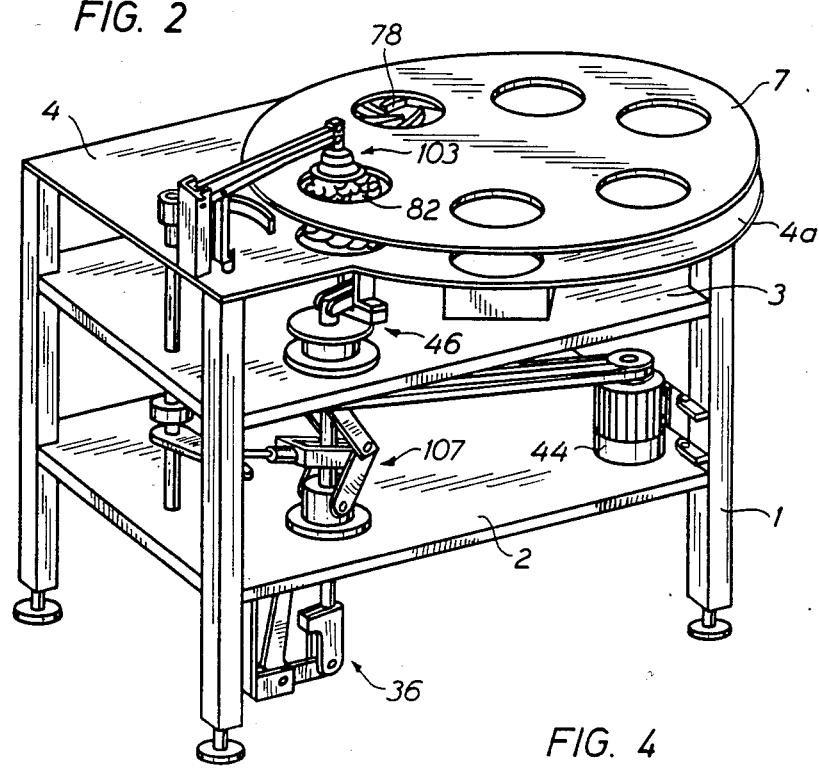
FIG. 4 is a view in perspective of the machine according to the invention showing a cauliflower head in hollowing position.

In the following a preferred embodiment of the invention is described with reference to the attached drawings, where FIGS. 1 and 4 show a machine consisting of a tubular frame 1 provided with a lower shelf 2, a central shelf 3, an upper table 4 and finally above the upper table 4 a pivoting table 7. The upper table 4 is partly along two of its sides formed with a circular part 4a, projecting beyond the frame. The diameter of this projecting, circular part or overhang is slightly greater than the diameter of the pivoting table 7. The table 7 is rotated step-by-step and comprises four to eight recesses, preferably four, five or six recesses depending on the sizes of the cauliflower heads. The illustrated machine has six recesses A–F.

To the table 4 a supporting device 103 for cauliflower heads is attached and on the underside of the pivoting table 7 there is, at each recess, a holding device 104. The holding device is controlled by a unit substantially comprising a size sensing arm 20 and a shaft 21 with associated parts, such as linkage arms, cams etc., which will be more closely described below.

Under the table 4 and more precisely centered under the hollowing recess E there is a unit 106 comprising an iris diaphragm 83 and associated means 60–67 for opening and closing this iris diaphragm. Under the iris diaphragm 83 there is a knife head 46 with a knife 50 and associated linkage arms and underneath a control device 107 for controlling the top position of the knife head. Under the control device 107 a device 36 for guiding the knife is in its turn arranged. Between these various devices and units there is a system of linkage arms, cams, etc., which will be described in more details below, for synchronizing the movements of the knife with the opening and closing of the iris diaphragm depending on the size of the cauliflowers heads, or other fruits or vegetables, to be hollowed.

When the recesses of the step-by-step pivotable table 7 is in position A, B or C these positions correspond to the feed positions of the product, position D to centering of the product, position E to hollowing and position F to discharge. In positions A, B or C each pocket successively receives a cauliflower head, which is moved forward during the pivoting of the table 7. On the drawing there is shown only one cauliflower head 82 in position E, i.e. the hollowing position, where due to that some parts of the pivoting table 7 have been cut out the arms 78 and links 75 forming the holding and centering devices for the cauliflower heads clearly appear.

FIG. 1 also shows the device for step-by-step pivoting the table 7, comprising an index gearbox 5 connected via a drive shaft 6 to the pivoting table 7. This device is arranged on the central shelf 3 of the frame, which gives the shortest possible length of the drive shaft 6, which is a great advantage considering the discontinuous operation of the pivoting table 7.

A motor 8 drives the index gearbox 5 by means of a worm reduction gear 9 and do thus constitute the source of power for the mentioned, pivoting device, but also constitute the source of power for the devices controlling the movements of the rotating knife 50, which will be described below, the opening and closing movements of the iris diaphragm 83 and for the movements of the supporting device 103 during the hollowing operation.

A second electric motor 44 is by means of a driving belt the source of power for the rotation of the knife head 46.

The movement of the control device is obtained by means of an angle drive 10 directly coupled to the worm reduction gear 9, the output shaft 11 of the angle drive rotating a cam shaft 15 through a chain wheel 12, a chain 13 and a chain wheel 14.

By means of the shaft 21 connected to the knife head 46 it is possible to detect the size of the cauliflower head 82 and to adopt the cutting position of the knife 50 to the diameter of the stalk.

In the following the necessary synchronization for all these devices is described as well as the function of the machine.

The cauliflower head that is placed in the recess A shall stop with its centre straight above the common vertical axis of the iris diaphragm 83 and the knife head 46, i.e., in the position E. The step-by-step pivoting table 7 has in the described embodiment six recesses A, B, C, D, E and F. By choosing an index gearbox 5, where each revolution of the input shaft corresponds to one sixth of a revolution of the output shaft 6, a correct driving of the pivoting table 7 is achieved. The synchronous turning of the cam shaft 15 is achieved by means of the angle drive 10 with the transmission ratio 1:1, the shaft 11, the chain wheel 12, the chain 13 and the chain wheel 14. The intermittent feed speed of the pivoting table 7 is determined by the rotation speed of the motor 8 and by the transmission ratio of the worm reduction gear 9.

In the following the device for holding the cauliflower heads in the recesses of the pivoting table 7 is described. The shaft 6 supports the table 7, which is placed ten to fifteen centimeters above the stationary table as shown in FIG. 1. In this illustrated embodiment the pivoting table 7 has six recesses with a pitch of sixty degrees. In this table five attachment holes are bored equally spaced around each recess, being the mounting holes for the pins 76, which support bearing housings for five arms 78, together constituting the holding device 104 for the cauliflower heads on the underside of the table 7. The number of holding arms 78 in each recess depends on the cauliflower size range for which the machine is designed. For a 6-station machine e.g. five holding arms are preferred and for a 4-station machine six holding arms are preferred. Another number of arms greater or smaller—is also possible and then particularly for other products than cauliflower heads, which make greater or smaller demands upon holding and centering of the product.

By mutually interconnecting all the bearing housings with link arms 75, a centering of the product is achieved during holding. The opening movement of the arms is given by a plastic ridge 79 attached to the bearing housing of that holding arm 78, which in each recess is situated at the periphery of the pivoting table 7. When these recesses are in the positions F, A, B and C the plastic ridge 79 bears against a bar 80 which keeps the holding arms in position of maximal opening. By means of a draw spring 81 the holding arms are brought together around the cauliflower head when this is transferred from position C to D, since between these positions the bar 80 ceases to actuate the plastic ridge 79, while again actuating the plastic ridge when transferred from position E to F.

The embodiment with six recesses, chosen in this case, makes a rational use of the space disposable on a circular table possible, where the operator easily can put a new cauliflower head in each recess, which then successively is transferred to the hollowing position E.

In the following the control device for regulating the height position of the knife head 46 and the degree of opening of the iris diaphragm 83 in relation to the size of the cauliflower head is described. When the cauliflower head is in position E, i.e. straight above the common vertical axis of the iris diaphragm 83 and the knife head 46, the size sensing arm 20 is brought inwardly against an arc 77, being attached to the holding arm 78 for the cauliflower head that in each recess is situated along the periphery of the pivoting table 7. An arm 22 is released from a cam 18 by the rotation of the cam shaft 15 and the angle of rotation of this arm depends on the size of the cauliflower head. A big cauliflower head gives a small angle of rotation and a small cauliflower head gives a great angle of rotation. A spring 25 presses the size sensing arm 20 against the arc 77 and thereby increases the force holding the head of cauliflower during the hollowing operation. By means of the shaft 21, the lever arm 22, and cam 23, toggle links 30 and 31, a bearing housing 28 and an axially displaceable hollow shaft 27 the knife head takes a height position, which is settled by the size of the cauliflower head. When this position is reached a shaft 60 is turned due to that a curve 16 on the cam shaft 15 has reached a position, where a cam 54, attached to an arm 55, has rolled up on the higher curve plane of the curve 16. At the turning of the shaft 60 by means of a lever aram 67 a spring 62 draws a lever arm 65 against a stop arm 68, which in relation to the size of the cauliflower head has taken a fixed position and hereby the segments of the iris diaphragm 83 are turned by means of link arms 63 and forms a circular opening that is proportional to the diameter of the cauliflower head.

In the following the rotation of the knife head 46, how the knife 50 is brought to an active position and being retracted therefrom when the hollowing operation is finished and the opening and closing of the iris diaphragm is described. As shown by FIG. 1 the rotation of the knife head 46 is given by the knife motor 44, which by means of a driving wheel 45, a driving belt 43, a wheel 29 and the hollow shaft 27 rotates the knife head 46. The above described setting of the height position of the knife head 46 results in a maximum deplacement of the wheel 29 of 60 mm. By placing the electric motor 44 at a distance of about 600 mm from the wheel 29, the driving belt 43, preferably a round rope, carries the axial displacement of the wheel 29 without disturbing its operation.

When the iris diaphragm 83 has taken the open position, a cam 41 rolls down onto the lower curve plane of a cam curve 19 due to the continued rotation of the cam shaft 15 and by means of the traction force in a spring 42 which turns a lever arm 40, on which a cam 41 a fastened. By means of a ball head 39, attached to the lever arm 40, a link head 38, with an attachment carried in a bearing in a bell crank 37, and a slip dowel extending into the ball head 39, a vertical movement is given to the knife guiding device 36 and to a knife rod 33. Since the knife rod 33 rotates, a bearing 34 is inserted for taking up this rotation. At the vertical upward movement of the knife rod 33, the knife 50 is moved upward by means of a lever arm 47, a link rod 48 and a knife moving arm 49. A knife support may move radially an angle $\alpha$ of between 10° and 30°, preferably between 15° and 20°. In cutting position the top of the knife 50 always reaches at least the vertical axis of the fruit or vegetable by means of the links 47 and 91. The knife 50 is moved toward its upper turning point at a speed controlled by the angle of inclination of the cam curve 19 and is moved downward when the cam 41 rolls downward on the cam curve 19. The cut out stalk of the caulifower head falls downward at the same moment as the knife 50 has reached its upper turning point and is discharged by an ejector (not shown) mounted on the rotating knife head in a discharge funnel, not shown either, situated on one side of the machine. When the knife 50 has reached its lower position, the cam 54 rolls downward on the cam curve 16, resulting in that the lever arm 55 and the shaft 60 are rotated by means of a spring 50 and thereby closing the iris diaphragm 83 through the lever arm 67, a pull rod 66, lever arms 64 and the link arms 63, which interconnect the different segments of the iris diaphragm 83.

Figure 3:
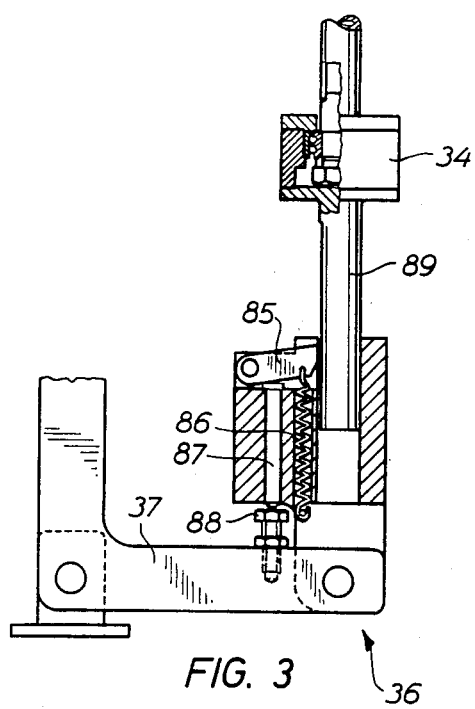

In the following the knife guiding device 36 for the upwardly movement of the knife rod 33 during the setting of the height position of the knife head 46 in relation to the size of the cauliflower head and for the upwardly and downwardly movement of the knife rod 33 during the hollowing operation is described. As shown in FIG. 1 the knife rod 33 is free to move both up and down when the knife guiding device 36 is in its lower position, by the fact that the knife guiding device 36 is provided with an adjustable locking device 85 (see FIG. 3), which is disconnected in this position. The knife rod 33 is thus in this position free to move both up and down. At the upward movement of the knife guiding device 36, the distance between the point on which a height adjustable pin 87 rests on an adjustable screw 88 and the bell crank 37 is increased, due to the resulting alteration of the angle between the knife guiding device 36 and the bell crank 37 at the upwardly movement of the bell crank 37. Hereby the locking device 85, in the form of a friction catch, is pressed by a spring 86 against a rod 89, given a plane surface at this side, whereby the knife guiding device 36 follows upwardly partly due to the traction force of the spring 86 and partly due to that the locking effect is increased by the wedge action that arises by the resistance to motion from the knife rod 33. When the knife guiding device 36 once again is brought downwards, this wedge action ceases and to make sure that the knife rod 33 does not stop in its upper position, the knife guiding device 36 has been provided with two resetting links 35, which reset the knife rod 33 to its lower position. Through the adjusting screw 88 the point of engagement of the friction catch at the rod 89 may be controlled, by changing the top position of the friction catch 85 by the aid of the pin 87 and the adjusting screw 88, when the knife guiding device 36 is in its lower position, since this affects the distance between the friction catch 85 and the rod 89. By e.g. setting the friction catch 85 at a higher position the knife guiding device 36 has to be moved a long distance upwards before the friction catch 85 engages the rod 89. The upper turning point of the knife 50 may thus be controlled by the adjusting screw 88.

In the following a device for keeping the size sensing arm 20 in the position which is determined by the size of the cauliflower head during the hollowing operating and therewith to prevent the tractive force of the spring 25 from crushing the head of cauliflower when the stalk has been cut out is described. At the adjustment of the iris diaphragm 83 the shaft 60 is always turned to the same position by means of the cam curve 16 and thereby the shaft 21 will be locked in the position set by the cauliflower head by means of the turning movement of a lever arm 59, fixed on the shaft 60, and a pull rod 58 pressing the brake blocks of a brake device 57 against a brake drum 56 fixed on the shaft 21. When the iris diaphragm 83 closes, the brake blocks are again released from the brake drum 56 by the turning of the shaft 60 in the opposite direction, and the cam curve 18 on the cam shaft 15 activates the lever arm 20, which is fixed on the shaft 21, and thereby releases the holding arms 78 from the cauliflower head. The pivoting table 7 makes one step ahead (counter-clockwise), whereby the holding arms 78 are brought outward by the plastic ridge 79 and the control bar 80 and the cut out clusters of cauliflower fall through a recess in the stationary table 4, which has the same centre position as the moving recess has in its discharge position F. The holding arms 78 are formed such that they create a closed ring in open position with a distance of about five mm from the stationary table 4 and their height is such that they almost reach the underside of the pivoting table 7, to which they are attached. Hereby is achieved that all the clusters are transferred to the discharge recess in the stationary table 4.

In the following the supporting device 103 for the heads of cauliflower during the hollowing operation is described. When the iris diaphragm 83 has taken the open position, a cam 53 rolls downward on a curve surface of an axial cam disk 17, whereby a cam carrier 52, fixed on a shaft 61, pulls a link arm 70 downward by means of a compression spring 69, whereby the free ends of the track rods 71 and 72, to which a carrier 73 with a rubber hood 74 is flexibly attached, are turned downwards. The rubber hood 74 is by the power of the spring 69 pressed against the top of the cauliflower head at the same time as the knife 50 is moving upwards (the effective movement of the knife), and the rubber hood 74 is again lifted upward, when the knife goes downward, by means of the axial cam disk 17, the cam 53, the cam carrier 52, the shaft 61, the link arm 70, the track rods 71 and 72 and the carrier 73.

In the following the synchronization of the movements of all devices is described, i.e. the manner of action of the embodiment illustrated in the figures. When the electric motor 44 is started, the rotation of the knife head 46 starts and when the electric motor 8 is started, the step-by-step rotation of the table 7 starts, where one of the six recesses of the table 7 in resting position always stops with its centre straight above the common vertical axis of the iris diaphragm 83 and the knife head 46. The operator places a cauliflower head with its top turned upwards in one of the recesses which are in feeding position A, B or C. The table 7 is then by the index gear box 5 rotated counter-clockwise a sixth revolution, whereby another recess comes in the first feed position A. As shown in FIG. 1 the holding arms 78 close up on the cauliflower head 82 when it has reached position D by influence of the spring 81, since the control bar 80 ceases to act on the plastic ridge 79 between the positions C and D. The head of cauliflower is then centered and held by the holding arms 78.

From this position D the recess with a head of cauliflower applied therein moves one step ahead and thus reaches the hollowing position E. During the step-by-step displacement from the feeding positions A, B and C, the lower part of the cauliflower head slides on the smooth upper portion of the stationary table 4. During the displacement of the recesses from one resting position to the next resting position, the lever arm 20 has by means of the shaft 21, the lever arm 21, the cam 23 and the cam 18 on the cam shaft 15 turned out from the pivoting table 7 to its outer position and is reset when a new recess is in resting position at the hollowing position E. Thereby the lever arm 26 will rest on the arc 77, which is fixed on the holding arm 78 and takes a resting position, that depends on the diameter of the cauliflower head being enclosed by the holding arms. The position of the size sensing arm 20 has at the same time adjusted the upper position of the knife head 46 by means of the lever arm 22, the spring 25, a ball head 24, a fork lever 26, the toggle links 30 and 31, the bearing housing 28, the wheel 29 and the hollow shaft 27, to which the knife head is fixed. At this moment the position of the size sensing arm 20 is locked by the brake device 57 by locking the brake drum 56 attached to the shaft 21 by means of the pull rod 58, the lever arm 59, the shaft 60, the lever arm 35, and the cam 54, which is attached to the lever arm 35 and rolls upwardly on the radial cam disk 16. The brake blocks in the brake device 57 is then moved against the brake drum 56 and thereby also locks the knife head 46 with regard to height.

At this moment the iris diaphragm 83 is opened by that the lever arm 67, with the shaft 60, the lever arm 35, the cam 54 and the cam curve 16, turns inwardly, whereby the traction power of the spring 62, by means of the lever arm 65 and the link arm 63, opens the iris diaphragm 83 just as much as allowed by the position of the stop arm 68, i.e. the rate of opening of the iris diaphragm is controlled by the position of the stop arm 68, which position depends on the diameter of the cauliflower head being in the hollowing position, since the stop arm 68 is fixed on the same shaft as that on which the size sensing arm 20 is fixed.

Immediately after the iris diaphragm 83 has taken its open position, the rubber hood 84 is through the spring 66 moved towards the top of the cauliflower head due to that the cam 53 rolls downward on the curve surface of the axial cam curve 17 and thereby releases the clamped and adjustable spring force of the spring 69. When the rubber hood 74 has taken its resting position at the top of the cauliflower head 82, the knife 50 is immediately raised by the spring 42 by that the cam 41 rolls downward on the curve surface of the radial cam disk 19, whereby the lever arm 40 to which the cam 41 is fixed, the ball head 39, the dowel link 38, the bell crank 37, the knife guiding device 36, the knife rod 33, the lever arm 47, the link rod 48 and the knife moving arm 49 transfer the upward movement to the knife 50. The knife head 46, which is continuously rotated by the electric motor 44, the driving wheel 45, the driving belt 43, the wheel 29 and the hollow shaft 27, to which the wheel 29 and the knife head 46 are fixed, has as, described above, taken a height position that is direct proportional to the diameter of the cauliflower and is kept in this position by the brake device 57. The upward movement of the knife may thus proceed without any changes in the height position of the knife head 46, and the knife 50 will therefore cut a whole ogival stalk from the centre of the cauliflower head during its movement upwards. The higher position the knife head 46 takes, the bigger the bottom diameter and height of the stalk will be. Inversely, the lower the position of the knife head 46, the smaller the diameter and height of the cut out stalk will be.

Figure 2:
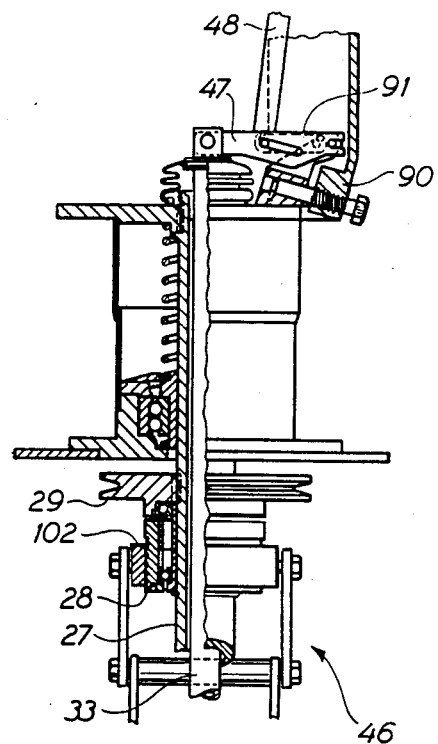
FIGS. 2 and 3 are sectional views of details of the machine according to the invention.

By means of the adjustment screw in FIG. 1 the angle of the toggle links 30 and 31 in relation to the vertical plane may be changed, which influences the distance of movement in height of the knife head at the adjustment of size and thereby the ratio between height and diameter of the cut out stalk. By means of the height adjustable ring 102 in FIG. 2, to which the upper link arms 39 are fixed, the upper turning point of the knife head may be adjusted when the angle between the toggle links 30 and 31 and the vertical plane is changed.

By rotating the knife head 46 at a speed of 300-800 revolutions per minute, a low cut resistance is obtained, since the knife 50 will be raised relatively slow during the hollowing operation controlled by the angle of inclination of the radial curve 19. When the knife 50 has reached its upper position, the stalk falls down and the knife 50 is quickly reset to its starting position due to that the curve surface of the radial curve has a bigger inclination for the downward movement of the knife 50 than for the upward movement. The cut out stalk is thrown out into a discharge funnel by an ejector (not shown) fixed on the rotating knife head 46.

When the knife 50 has reached its lower position the iris diaphragm 83 closes immediately due to that the radial cam disk 16 turns the lever arm 67 in a direction opposite that when opening the iris diaphragm, whereby also the brake drum 56 on the shaft 21 is released.

The whole course is now completed and is followed by a new rotation of the pivoting table 7 one sixth revolution, which causes the cut out clusters of cauliflowers to be brought to the discharge position F, at the same time as the holding arms 78 are opened by the control bar 80, which at the displacement influences the plastic ridge 79 fixed at the bearing housing of one of the holding arms. Since the stationary table 4 is provided with a cavity at the discharge position of the recesses, the clusters of the cauliflowers fall down through this cavity and is then transported away on a conveyor belt or an elevator (not shown) for further processing.

The cut out stalk is carried away by the aid of a conveyor belt or elevator and may advantageously be cut into cubes or stripes in a cutting machine.

At the constant rotation of the table 7 all the steps are repeated and the feeding recesses will therefore successively feed new cauliflower heads to the hollowing position E at a capacity 30-40 heads of cauliflower per minute, preferably 34-36 heads of caulifower per minute, a capacity that is substantially determined by the influence of the mass forces on the mechanical constructive elements of the machine and the vibrations, created by the step-by-step transportation of the pivoting table 7.

A person skilled in the art may modify the above described embodiment in various ways, within the scope of the invention.

I claim:

1. A machine for hollowing vegetables, fruits or parts thereof, having at their base a central portion, to be separated along a hemispherical or ogival surface from the surrounding portion, which comprises a step-by-step pivoting table; at least one recess in the table; a holding device in the table for holding the fruit or vegetable; a partition device that is controlled in such a way that it leaves an opening for the cut out part to fall away from the other part of the vegetable or fruit; a vertically moveable and rotatable knife head; a knife connected to the knife head; a first control device for controlling the movements of the knife; and a second control device for controlling the vertical position of the knife head.

2. A machine in accordance with claim 1, wherein the partition device is an iris diaphragm and that the opening has a diameter which is slightly larger than the diameter of the cut out part.

3. A machine in accordance with claim 2, further comprising a cam curve, at least one toggle link and a spring, for adjusting the height position of the knife head in relation to the outer diameter of the vegetable or fruit.

4. A machine in accordance with claim 3, further comprising an electric motor, a round rope transmission and a wheel for rotation of the knife head, whereby the wheel follows the upward and downward movements of the knife head.

5. A machine in accordance with claim 2, wherein the knife head comprises a knife support the radial displacement of which takes place along a line presenting an inclination of between 20 and 30 degrees, preferably 15-20 degrees, with reference to the horizontal plane, when changing the cutting diameter of the knife in relation to the outer diameter of the vegetable or fruit.

6. A machine in accordance with claim 2, wherein the second control device, the purpose of which is the control the upward and downward movements of the knife head is provided with an adjusting screw and a ring as well as at least one toggle link, whereby the angle of the toggle links relative to the vertical plane may be controlled by through the adjusting screw and the ring.

7. A machine in accordance with claim 1, further comprising a driving device for step-by-step rotation of the pivoting table.

8. A machine in accordance with claim 1, wherein the holding device comprises at least one holding arm, which are situated around every recess (A-F) in the pivoting table.

9. A machine in accordance with claim 8, further comprising a brake device, which locks the holding arms in the adjusted position during the hollowing operation.

10. A machine in accordance with claim 1, further comprising a supporting device, which prevents the vegetable or fruit from being lifted when the knife makes its cutting movement.

* * * * *